United States Patent Office 3,523,135
Patented Aug. 4, 1970

3,523,135
PROCESS FOR PRODUCING PYROMELLITIC ACID
Taisuke Asano, Kenji Kato, and Kunio Uchimura, Kawasaki, Kanagawa, Japan, assignors to Mitsubishi Petrochemical Co., Ltd., Tokyo, Japan
No Drawing. Filed July 17, 1967, Ser. No. 653,683
Claims priority, application Japan, July 30, 1966,
41/49,791
Int. Cl. C07c 63/02
U.S. Cl. 260—524     2 Claims

ABSTRACT OF THE DISCLOSURE

Process for producing pyromellitic acids which comprises subjecting 1,2,4,5-tetraalkylbenzene wherein alkyl groups are methyl, ethyl or isopropyl groups to a gas phase catalytic oxidation in the presence of a combination catalyst consisting of oxides of (1) vanadium, (2) phosphorus and (3) at least a member selected from the group consisting of titanium, tungsten and molybdenum.

BACKGROUND OF THE INVENTION

Field of the invention

This invention relates to a process for producing pyromellitic acids, particularly pyromellitic acid (benzene-1,2,4,5-tetracarboxylic acid) or acid anhydrides thereof, by a gas phase catalytic oxidation of 1,2,4,5-tetraalkylbenzene, wherein alkyl groups are methyl, ethyl or isopropyl groups, respectively.

More particularly, this invention relates to a process for the gas phase production of pyromellitic acid by using a specific catalyst composition.

Description of the prior art

It is well known that pyromellitic acid may be produced by a gas phase catalytic oxidation of 1,2,4,5-tetraalkylbenzene. There are proposed, for example, processes for oxidizing durene (1,2,4,5-tetramethylbenzene) by using a catalyst composition comprising vanadium oxide and potassium sulfate as described in the specification of U.S. Pat. No. 2,509,855, and by using vanadium oxide or tin vanadate as a catalyst, as described in the specification of U.S. Pat. No. 2,576,625.

Also, Dutch Pat. No. 6,413,133 discloses a process for oxidizing 1,2,4,5-tetraalkylbenzene by using a catalyst composition obtained by incorporating oxides of tungsten, titanium, aluminium or tin into vanadium oxide.

SUMMARY OF THE INVENTION

We have conducted a thorough study of the oxidation of 1,2,4,5-tetraalkylbenzene in view of the great utility of pyromellitic acids. As a result, we have concluded that although vanadium oxide catalyst prepared in the conventional method has to some extent an ability to produce pyromellitic acids, the performance is quite unsatisfactory even in the oxidation of durene which is believed to give relatively good result; and that the incorporation of additives to the above-mentioned catalyst proposed in the prior art only affords a poor yield of pyromellitic acids remote from satisfaction from a commercial point of view.

It is, therefore, an object of this invention to eliminate this drawback accompanied by vanadium oxide catalyst.

We now have found that the object of this invention can be accomplished by subjecting 1,2,4,5-tetraalkylbenzene wherein alkyl groups are methyl, ethyl or isopropyl groups, to a gas phase catalytic oxidation in the presence of a combination catalyst comprising oxides of vanadium, phosphorus and at least a member selected from the group consisting of titanium, tungsten and molybdenum.

The feature of the process of this invention resides in that not only the yield of pyromellitic acid anhydride per se is quite good but also the high yield can be maintained for a prolonged period of time.

More specifically, the use of total of 10% by weight of catalyst composition consisting of vanadium oxide and tungsten oxide in an atomic ratio of vanadium to tungsten of 10:1.5 supported on sintered alumina as a carrier yields only below 90% by weight of pyromellitic acid under reaction conditions including a space velocity of 5,000–20,000 l./hr./l., a concentration of durene of 0.33% by volume and a reaction temperature of 400–500° C.

On the other hand, although the use of total of 10% by weight of catalyst composition consisting of vanadium oxide and phosphorus oxide in an atomic ratio of vanadium to phosphorus of 10:1.5 supported on sintered alumina as a carrier under the same reaction conditions as above affords a yield of pyromellitic acid of approximately 100% by weight, the catalyst activity is gradually decreased and it cannnot be used for a prolonged period of time.

The catalyst composition which may be used in the process of this invention comprising oxides of vanadium, phosphorus and at least a member selected from the group consisting of titanium, tungsten and molybdenum has outstanding performances with regards to the improved yield of pyromellitic acids and the prolonged durability of catalyst activity over the binary catalysts mentioned above.

For example, the use of 10% by weight of ternary catalyst composition comprising oxides of vanadium, phosphorus and tungsten supported on sintered alumina as a carrier gives a high yield of pyromellitic acids of more than 110% by weight, and moreover, no important decrease in the catalyst activity is observed after the use of prolonged period of use.

The ternary catalyst composition used in the process of this invention comprising oxide of vanadium, phosphorus and at least a member selected from the group consisting of titanium, tungsten and molybdenum as a third component, may be prepared in the conventional methods. For example, it may be prepared by combining a solution or a suspension containing vanadium oxide or vanadium compound which readily gives oxide by the thermal decomposition thereof, phosphorus oxide or phosphorus compound which readily gives oxide by the thermal decomposition thereof, and oxide of said third component or compound thereof which readily gives oxide by the thermal decomposition, simultaneously or separately, with suitable carriers and heat-treating the resulting mixture.

In this instance, it is desirable to add compounds which may be decomposed and vaporized under the heat-treating condition, for example, organic acids such as acetic acid and oxalic acid, and inorganic acids such as nitric acid and nitrous acid, to the solution or suspension mentioned above. The incorporation of these compounds mentioned above serves to enhance the solubility and diffusibility of the catalyst components and gives other favorable effects.

The heat-treatment of the mixture of the catalyst components and carrier is usually carried out at a temperature of 300–700° C., and most preferably 400–600° C. This treatment is conducted in an atmosphere containing oxygen.

Although the catalyst composition of this invention may be used without using any carriers, it is normally used in the form supported on carriers.

Carriers which may be used in the process of this invention include whose having not so large surface area, for example, pumice, sintered alumina, aluminium sponge, silicon carbide, etc.

In the catalyst composition thus prepared, there must be present required amounts of phosphorus and the third component in order to obtain the effect of the catalyst of this invention. In general, the amount of phosphorus is less than 50 atoms, and that of the third component element is less than 50 atoms per 100 atoms of vanadium.

The gas phase catalytic oxidation of 1,2,4,5-tetraalkyl-benzene according to the process of this invention is substantially the same as those of conventional processes known heretofore. Thus, it may be carried out either in fixed bed or non-fixed bed such as fluidized bed systems, and under atomspheric, nearly atmospheric, superatmospheric or subatmospheric pressures.

Air is most commonly used as an oxidizing agent in the process of this invention and it may either be used as it is or in admixture with nitrogen, steam, hydrogen, carbon dioxide and helium. Also, a gas containing pure oxygen or molecular oxygen diluted with such diluting gases as mentioned above may be conveniently used.

The proportion of the oxidizing agent to the starting hydrocarbon is at least in excess of the theoretical amount which, in case of using durene, is 6 mols of oxygen per mol of durene. If air is used as an oxidizing agent, 20–200 mols of air per mol of the starting hydrocarbon is preferable.

As far as the amount of oxygen used is concerned, in general, the use of an excessively smaller amount of oxygen presents a difficulty in the formation of pyromellitic acids and decreases the one-pass yield thereof. Adversely, a large excess amount causes a difficulty in the recovery of pyromellitic acid from the product gas.

As for the reaction temperature, a lower temperature slows down the reaction rate and increases the formation of intermediate oxides, whereas a higher temperature leads to a complete combustion. Thus, in general, applicable reaction temperature ranges 300–650° C., and most preferably 350–500° C.

The space velocity of the starting gas with respect to the catalyst varies depending upon the type of catalyst and reaction conditions such as the temperature employed. However, in general, it ranges from 300 to 30,000 l./hr. per liter of the catalyst used, under a standard condition.

The recovery of the desired product from the gaseous product obtained by the reaction can be accomplished according to the procedures substantially the same as those adopted in the conventional treatment of the gaseous product in the gas phase reaction of this type.

In recovering pyromellitic acid and anhydrides thereof which are the typical products in the process of this invention, the recovery can also be achieved by cooling the resultant gaseous product obtained in the reaction.

In the process of this invention, the desired pyromellitic acids are obtained in the form of free acid or acid anhydride. However, since they are convertible to each other, they may be obtained in any desired forms by altering the method of recovering the oxide product.

In the process of this invention, tri-, di- or monocarboxylic acids are produced as oxidation intermediates and it is possible to operate the process of this invention for the production of these products. However, if the operation of the process of this invention is directed to the production of pyromellitic acids or anhydrides thereof, then, the gaseous oxidation products containing these compounds of lower degree of oxidation should be subjected to sufficient oxidation conditions once more.

Normally, in the gas phase catalytic oxidation of alkylbenzenes, the rate of reaction decreases as the number of carbon atoms in the alkyl group is increased. Thus, the rate of reaction in the process of this invention varies somewhat depending upon the type of alkyl groups. For example, the yield tends to decrease when the isopropyl group is involved as compared with the methyl group.

DESCRIPTION OF THE PREFERRED EMBODIMENTS

This invention will be explained more fully and practically in the following examples.

It should not be construed, however, that these examples restrict this invention as they are given merely by way of illustration.

EXAMPLE 1

To a mixed aqueous solution of ammonium vanadate, ammonium phosphate and tungstic acid containing vanadium, phosphorus and tungsten in an atomic ratio of 10:1.5:1.5, was added 10 mols of oxalic acid per mol of ammonium vanadate. To the resulting mixture was added 7 parts by weight of alundum of 8–10 mesh per part by weight of vanadium pentoxide and the mixture was heated with stirring to be dried up and solidified. The resulting mixture was sintered at 450° C. in a stream of air for 3 hours.

To a U-shaped Pyrex glass reactor of 17 mm. inner diameter into which a Pyrex glass tubing of 5 mm. outer diameter containing a temperature controlling thermocouple was inserted, was charged 30 cm.$^3$ of the catalyst prepared as above, and the reactor was put into a nitre bath. After the temperature of the bath was raised to 450° C., air containing 0.33% by volume of durene was passed through a layer of the catalyst at a flow rate of 180 l./hr., the volume being under a standard condition, and the reaction was carried out for 3 hours to give 13.7 g. of a solid product. The product thus obtained contained a sum of 93.0% by weight of pyromellitic acid anhydride and pyromellitic acid calculated in terms of an anhydride, and this corresponded to a yield of 119.2% by weight based on the weight of durene used.

The reactions were repeated consecutively 10 times by using the same catalyst for a total of 30 hours, and in the last run, the yield of a sum of pyromellitic acid anhydride and pyromellitic acid calculated in terms of an anhydride was 119.0% by weight based on the weight of durene and no important change in the catalyst activity was observed.

EXAMPLE 2

To a mixed suspension of vanadium pentoxide, phosphoric acid, titanium oxide and oxalic acid, which contained vanadium, phosphorus and titanium in an atomic ratio of 10:1.5:10, and oxalic acid in a proportion of 10 mols per mol of vanadium pentoxide, was added 10 parts by weight of carborundum of 8–10 mesh per part by weight of vanadium pentoxide, and the resulting mixture was heated with stirring to be dried up and solidified. The resulting solid mixture was sintered at 450° C. in a stream of air for 3 hours.

To the same reactor as used in Example 1 was charged 6 cm.$^3$ of the catalyst prepared as above, and the reactor was put into a nitre bath. After the temperature of the bath was raised to 400° C., air containing 0.64% by volume of durene was passed through a layer of the catalyst at a flow rate of 35 l./hr., the volume being under a standard condition, and the reaction was carried out for 3 hours to give 4.3 g. of a solid product. The product thus obtained contained a sum of 90.5% by weight of pyromellitic acid anhydride and pyromellitic acid calculated in terms of an anhydride and this corresponded to a yield of 96.8% by weight based on the weight of durene used.

The reactions were repeated consecutively 10 times using the same catalyst for a total of 30 hours, and in the last run, the yield of the sum of pyromellitic acid anhydride and pyromellitic acid calculated in terms of an anhydride was 97% by weight based on the weight of durene used.

EXAMPLE 3

A mixed aqueous solution of ammonium methavanadate, phosphoric acid and ammonium molybdenate containing vanadium, phosphorus and molybdenum in an atomic ratio of 10:1.5:1.5, was dried and solidified, and further heated with stirring to be sintered. After the same was allowed to stand to cool, it was crushed into particles of 8–10 mesh and used as a catalyst in the instant example.

To the same reactor as used in Example 1 was charged 30 cm.$^3$ of said catalyst, and the reactor was put into a nitre bath. While maintaining the bath temperature at 500° C., air containing 0.48% by volume of durene was passed through a layer of the catalyst at a flow rate of 30 l./hr., the volume being under a standard condition, and the reaction was carried out for 5 hours to give 4.7 g. of a solid product. The product thus obtained contained a sum of 92.0% by weight of pyromellitic acid anhydride and pyromellitic acid calculated in terms of an anhydride, and this corresponded to a yield of 100.3% by weight based on the weight of durene used.

The reactions were repeated consecutively 6 times using the same catalyst for a total of 30 hours, and in the last run, the yield of the sum of pyromellitic acid anhydride and pyromellitic acid calculated in terms of an anhydride was 101.0% by weight based on the weight of durene used.

EXAMPLE 4

To a mixed suspension of ammonium methavanadate, ammonium phosphate, titanium oxide and oxalic acid, which contained vanadium, phosphorous and titanium in an atomic ratio of 10:1.5:1.5, and oxalic acid in proportion of 10 mols per mol of ammonium methavanadate, was added 10 parts by weight of alundum of 8–10 mesh per part by weight of vanadium pentoxide, and the resulting mixture was heated with stirring to be dried up and solidified. The resulting solid mixture was sintered at 500° C. in a stream of air for 3 hours.

To the same reactor as used in Example 1 was charged 6 cm.$^3$ of the catalyst prepared as above, and the reactor was put into a nitre bath. After the temperature of the bath was raised to 400° C., air containing 0.25% by volume of 2,5-diisopropylbenzene-p-xylene was passed through a layer of the catalyst at a flow rate of 35 l./hr. and the reaction was carried out for 10 hours to give 5.7 g. of a solid product. The product thus obtained contained a sum of 91.0% by weight of pyromellitic acid anhydride and pyromellitic acid calculated in terms of an anhydride and this corresponded to a yield of 69.8% by weight based on the weight of the 2,5-diisopropylbenzene-p-xylene used.

The reactions were repeated consecutively 3 times using the same catalyst for a total 30 hours and, in the last run, the yield of the sum of pyromellitic acid anhydride and pyromellitic acid calculated in terms of an anhydride was 68.5% by weight based on the weight of material used.

COMPARATIVE EXAMPLE 1

This example illustrates the performance of a catalyst composition containing no third component for comparison.

To a mixed aqueous solution of ammonium methavanadate, phosphoric acid and oxalic acid, which contained vanadium and phosphorus in an atomic ratio of 10:1.5, and oxalic acid in a proportion of 10 mols per mol of ammonium methavanadate, was added 7 parts by weight of alundum of 8–10 mesh per part by weight of vanadium pentoxide and the resulting mixture was heated with stirring to be dried up and solidified. The resultant solid mixture was sintered at 450° C. in a stream of air for 3 hours. To the same reactor as used in Example 1 was charged 18 cm.$^3$ of the catalyst prepared as above, and the reactor was put into a nitre bath. After the temperature of the bath was raised to 400° C., air containing 0.33% by volume of durene was passed through a layer of the catalyst at a flow rate of 180 l./hr., the volume being under a standard condition, and the reaction was carried out for 3 hours to give 11.7 g. of a solid product.

The product thus obtained contained a sum of 73.7% by weight of pyromellitic acid anhydride and pyromellitic acid calculated in terms of an anhydride, and this corresponded to a yield of 80.8% by weight based on the weight of durene used.

The reactions were repeated consecutively 4 times using the same catalyst and, in the last run, the yield of the sum of pyromellitic acid anhydride and pyromellitic acid calculated in terms of an anhydride was 60.5% by weight and the yield was greatly decreased.

COMPARATIVE EXAMPLE 2

This example illustrates the performance of a catalyst composition containing no phosphorous for comparison.

To a mixed aqueous solution of ammonium methavanadate, tungstic acid and oxalic acid which contained vanadium and tungsten in an atomic ratio of 10:1.5, and oxalic acid in a proportion of 10 mols per mol of ammonium methavanadate, was added 7 parts by weight of alundum of 8–10 mesh per part by weight of ammonium methavanadate and the resulting mixture was heated to be dried up and solidified. The resultant solid mixture was sintered at 450° C. in a stream of air for 3 hours.

To the same reactor as used in Example 1 was charged 10 cm.$^3$ of the catalyst prepared as above, and the reactor was put into a nitre bath. After the temperature of the bath was raised to 400° C., air containing 0.33% by weight of durene was passed through the catalyst at a flow rate of 180 l./hr., the volume being under a standard condition, and the reaction was carried out for 3 hours to give 10.3 g. of a solid product. The product thus obtained contained a sum of 85.6% by weight of pyromellitic acid anhydride and pyromellitic acid calculated in terms of an anhydride and this corresponded to a yield of 82.7% by weight based on the weight of the durene used.

We claim:

1. A process for producing pyromellitic acids which comprises subjecting 1,2,4,5-tetraalkylbenzene, wherein the alkyl group is selected from the group consisting of methyl, ethyl and propyl, to a gas phase catalytic oxidation in the presence of a combination catalyst consisting essentially of the oxides of vanadium, phosphorus and at least one element selected from the group consisting of titanium, tungsten and molybdenum in which, per 100 atoms of vanadium, there are less than 50 atoms of phosphorous and less than 500 atoms of said member selected from the group consisting of titanium, tungsten and molybdenum.

2. A process according to claim 1 wherein the oxidation is carried out at a temperature between 300° C. and 650° C. and the space velocity of said tetraalkylbenzene with respect to said combination catalyst is between 300 and 30,000 l./hr. per liter of catalyst.

References Cited

UNITED STATES PATENTS

| 1,694,122 | 12/1928 | Jaeger | 260—524 |
| 2,509,855 | 5/1950 | Beach | 260—524 |
| 2,773,921 | 12/1956 | Rylander et al. | 260—524 |

LORRAINE A. WEINBERGER, Primary Examiner

R. S. WEISSBERG, Assistant Examiner